United States Patent [19]

Cook et al.

[11] Patent Number: 5,533,016

[45] Date of Patent: Jul. 2, 1996

[54] COMMUNICATIONS NETWORK RING ROUTER

[75] Inventors: William J. Cook, Madison; Paul D. Seymour, Mountain Lakes, both of N.J.

[73] Assignee: Bell Communications Research, Inc., Morristown, N.J.

[21] Appl. No.: 242,799

[22] Filed: May 16, 1994

[51] Int. Cl.⁶ .............................. H04J 3/02; H04L 12/42
[52] U.S. Cl. ..................... 370/54; 370/94.3; 370/85.15
[58] Field of Search .................. 370/54, 60, 61, 370/58.1, 58.2, 58.3, 85.15, 94.1, 94.3; 379/219, 220, 221

[56] References Cited

U.S. PATENT DOCUMENTS

| | | | |
|---|---|---|---|
| 5,291,490 | 3/1994 | Conti et al. | 370/96.1 |
| 5,297,137 | 3/1994 | Ofek et al. | 370/60 |
| 5,384,768 | 1/1995 | Fujii | 370/54 |

Primary Examiner—Wellington Chin
Assistant Examiner—Huy D. Vu
Attorney, Agent, or Firm—Leonard Charles Scuhyta; James W. Falk

[57] ABSTRACT

A ring is routed through a subset of nodes of a communication network by first providing a branch-decomposition having a pattern relating to separations of the network. The branch-decomposition can be performed using internal two-separations, internal three-separations, eigenvector separations and pushing. If the branch-decomposition has a branch-width less than or equal to a predetermined constant value, then the branch-decomposition is used to determine costs associated with portions of the ring passing through separations of the network by examining matchings corresponding to edges of the branch-decomposition and selecting a lowest cost ring by examining the matchings and choosing a lowest cost set of matchings containing the subset of nodes. The branch-decomposition can be provided once for a fixed network and then costs can be determined and the ring route selected repeatedly for different subsets of ring nodes and different edge costs. The edge costs can be negative.

6 Claims, 6 Drawing Sheets

COMMUNICATIONS NETWORK RING ROUTER

FIELD OF THE INVENTION

This invention relates to the field of communications networks and more particularly to the field of providing a communication path through a plurality of nodes of a communication network.

BACKGROUND OF THE INVENTION

Complex telecommunication networks, such as telephone networks, are configured using a plurality of nodes (vertices) that are interconnected via communication lines (edges). For example, a Synchronous Optical Network (SONET) used as an Interoffice Facility (IOF) can have dozens or even hundreds of interconnected nodes.

The interconnection among the nodes is a function of the costs for each connection (edge cost) and the expected or measured communications traffic among the various nodes. The cost of an edge is based on a variety of functional factors familiar to one of ordinary skill in the art, such as the communication medium used to interconnect the nodes and the distance between the nodes. It is often desirable to provide a redundant path of minimum cost among a selected subset of the network nodes that are in communication. Selection of the subset of nodes is based on a variety of functional factors familiar to one of ordinary skill in the art, such as measured or expected volume of communication traffic between the nodes.

One way to provide a redundant path through the subset of nodes is to provide a "ring" or circuit through the selected subset of the nodes. The ring consists of edges of the network forming a closed path that does not pass through the same node twice. Consequently, for any two nodes on the ring, there are two separate communication paths. One path is in the "clockwise" direction on the ring and the other path is in the "counterclockwise" direction on the ring.

For a given subset of nodes, it is desirable to find the lowest cost ring passing through the subset of nodes. That is, assuming each edge has a particular cost, it is desirable to find the set of edges having the lowest total cost that passes through the subset of nodes. In some instances it may be possible to simply try all of the possible combinations of interconnections. However, for complex networks, this method is ineffective because of the large number of computations involved. Other methods for determining the lowest cost ring exist, but these methods also are computationally cumbersome and often take an unacceptable amount of time to execute.

It is desirable, therefore, to provide a communications network ring router that overcomes the deficiencies of known systems.

SUMMARY OF THE INVENTION

According to the present invention, a communication network has a plurality of nodes which are interconnected via edges. Each edge has a particular cost. A ring is routed through a subset of the nodes of the communication network by first providing a branch-decomposition having a pattern relating to separations of the network. If the branch-width of the branch-decomposition is less than or equal to a predetermined constant value, then the branch-decomposition is used to determine a route for the lowest cost ring passing through the subset of nodes by minimizing the sum of the costs of the edges that are part of the ring. Limiting the branch-width to a predetermined constant value minimizes the processing time needed to calculate the lowest cost ring passing through the subset of nodes.

Providing the branch-decomposition can include testing if an internal two-separation exists in the communications network, separating the communication network using an internal two-separation if an internal two-separation exists, and pushing the separation thus obtained. Testing, separating, and pushing can be repeatedly performed until no further internal two-separations are possible.

Providing the branch-decomposition can also include testing if an internal three-separation exists in the communications network, separating the communication network using an internal three-separation if an internal three-separation can be performed, and pushing the separation thus obtained. Testing, separating, and pushing can be repeatedly performed until no further internal three-separations are possible.

Providing a branch-decomposition can also include pushing separations of the communications network that have not been previously pushed, providing an eigenvector separation of the communications network, and testing if the order of the eigenvector separation is less than or equal to the predetermined constant value. Eigenvector separating, testing and pushing can be repeatedly performed until no further separation of the network is possible as long as the orders of the eigenvector separations are less or equal to the predetermined constant value.

The branch-decomposition can be provided once for a fixed network so that costs can be determined and the ring route selected repeatedly for different subsets of ring nodes and different edge costs.

BRIEF DESCRIPTION OF DRAWINGS

FIG.'s 6A–6H illustrate a portion of a communications network being separated.

FIG.'s 7A and 7B illustrate partial branch-decompositions associated with separations for a network.

DETAILED DESCRIPTION OF DRAWINGS

Figure 1:
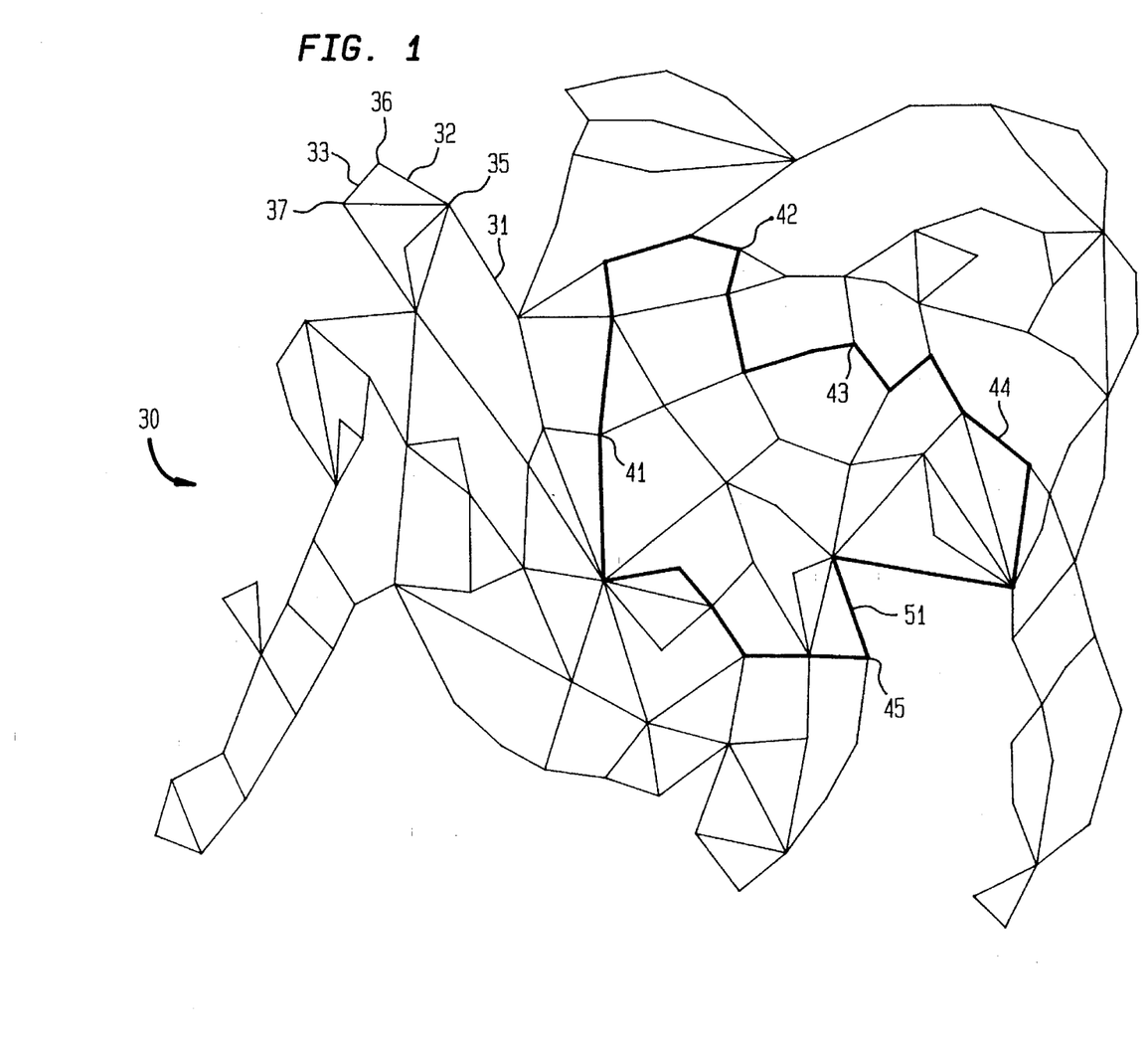
FIG. 1 is a schematic view of a communications network.

Referring to FIG. 1, a communications network 30 is comprised of a plurality of edges and vertices (nodes). The edges are used to interconnect the nodes. Three edges 31–33 are shown in conjunction with three vertices 35–37. The edge 33 is incident with the vertices 36, 37 and connects the vertex 36 with the vertex 37. The edge 32 is incident with the vertices 35,36 and connects the vertex 35 with the vertex 36. The edge 31 is incident with the vertices 35.

Each node of the network 30 is associated with conventional communications equipment that routes communications through the nodes. If communication is desired between a first and a second node that are not directly connected via a single edge, then communications equipment at other nodes that are typically between the first and second nodes routes the communication traffic to and from the first and second nodes. For example, if communication is desired between the node 35 and the node 37, then, if possible, communication is routed through the node 36 via the edges 32, 33 by communications equipment at the node 36. The communications equipment at the node 36 passes the communication from the node 35 on to the node 37 and passes communication from the node 37 on to the node 35.

A plurality of nodes 41–45 that form a subset of nodes of the network 30 are provided as an input to the ring router application. Redundant intercommunication between the nodes 41–45 is provided by a ring that extends through the nodes 41–45. A ring consists of edges of the network 30 forming a closed path that does not pass through the same node twice.

As can be seen examining FIG. 1, there are many possible rings through the nodes 41–45. One possible ring 51 is shown by heavy lines. The ring 51 provides redundant communications between any two of the nodes 41–45 because communications traffic can be routed in both directions around the ring. A single break in any portion of the ring 51 will not isolate any one of the nodes 41–45 from any other one of the nodes 41–45.

Each edge of the network 30 has a particular cost. The particular cost of each edge is provided as an input to the ring router application. As discussed in more detail hereinafter, it is possible to have edges with negative costs. The cost of providing the ring 51 is the sum of the cost of each edge of the ring 51. It is desirable to find a ring through the nodes 41–45 having the lowest cost.

Figure 2:
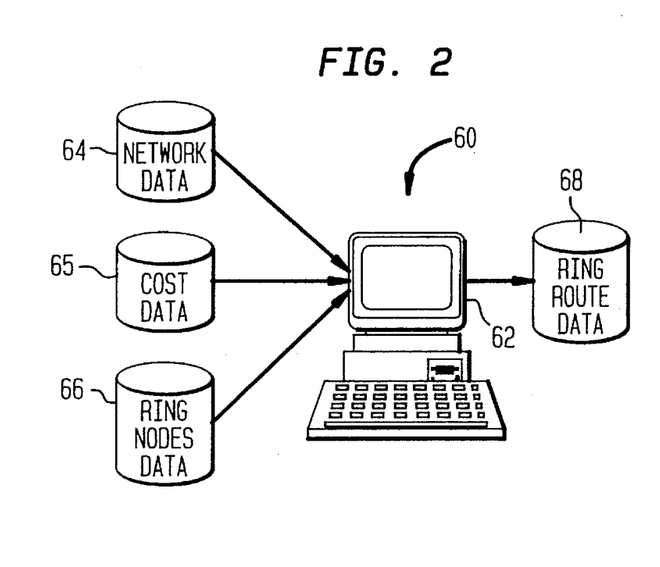
FIG. 2 shows a system for determining a ring route for a subset of nodes of a communications network.

Referring to FIG. 2, a system 60 for determining a lowest cost ring through a plurality of nodes of a network includes a processor 62. The processor 62 can be an IBM PC, another type of personal computer, a computer workstation, a minicomputer, a mainframe, or any other type of processor capable of executing the ring router application described hereinafter. Furthermore, the ring router application can be a stand-alone computer application or can be part of a larger computer application containing other code for performing similar network functions that are not illustrated herein.

The processor 62 is provided with input data including network data 64, cost data 65, and ring nodes data 66. The network data 64 represents the configuration of an entire communications network including all nodes and interconnections or proposed interconnections (i.e. edges) between the nodes. The details of representing a communications network as computer data is known to one of ordinary skill in the art and is not discussed further herein. The cost data 65 represents the cost of each edge and can be either estimated or derived empirically. The ring nodes data 66 represents a subset of nodes of the communications network through which a ring is to pass. The data 64–66 can be provided either separately or together from a variety of conventional sources. For example, the data 64–66 can be entered manually and stored in a ROM or on a floppy or hard disk. It is also possible to integrate the network data 64 with the application (i.e., to provide a fixed network configuration) and vary the cost data 65 and/or the ring nodes data 66 to determine different ring configurations.

The processor 62 processes the input data 64–66 to determine a lowest cost ring route through ring nodes of the ring nodes data 66. The processor 62 provides an output to the ring route data 68 that indicates the lowest cost route. The ring route data 68 can be provided in a plurality of conventional forms including a computer printout, a file on a floppy or hard disk, or as a computer screen display.

The processor 62 determines the lowest cost ring route by first breaking up the communications network 30 to provide a branch-decomposition having a pattern relating to the separations of the network 30. A branch-decomposition is a tree data structure wherein each leaf node of the tree represents an edge of the network and each non-leaf node of the tree is connected to exactly three edges. A tree contains no circuits.

Figure 3A:
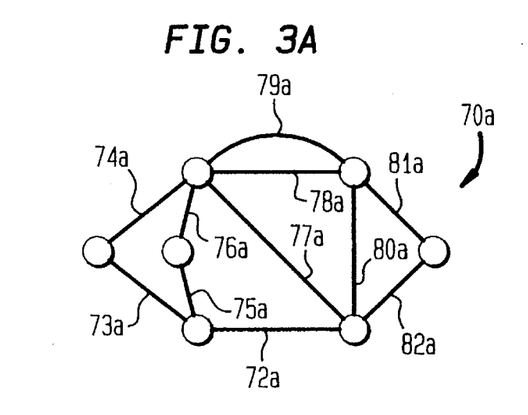
FIG. 3A is a schematic view of a relatively small communications network.
Figure 3B:
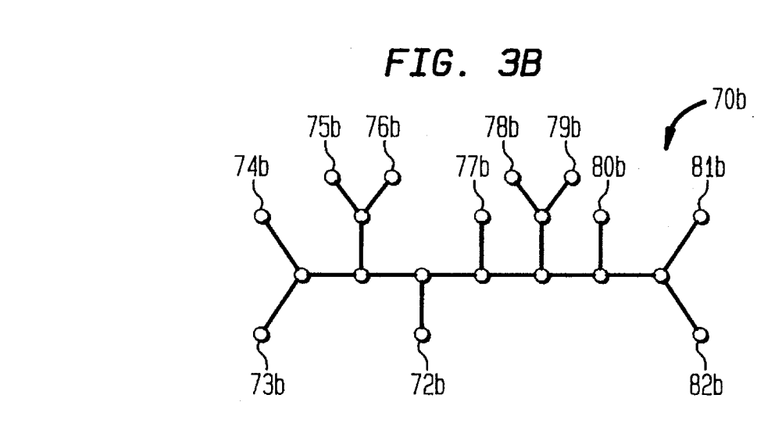
FIG. 3B is a branch-decomposition of the communications network shown in FIG. 3A.

Referring to FIG. 3A, a simplified communications network 70a has a plurality of nodes and a plurality of edges 72a–82a for interconnecting the nodes. FIG. 3B illustrates a branch-decomposition 70b for the network 70a of FIG. 3A. The branch-decomposition 70b includes a plurality of leaves 72b–82b that correspond to each of the edges 72a–82a of the network so that, for example, the leaf 72b corresponds to the edge 72a, the leaf 73b corresponds to the edge 73a, and so on. Note that each internal (non-leaf) node of the branch-decomposition 70b is connected to exactly three edges of the branch-decomposition 70b and that every leaf 72b–82b of the branch-decomposition 70b corresponds to one of the edges 72a–82a of the network 70a.

Figure 3C:
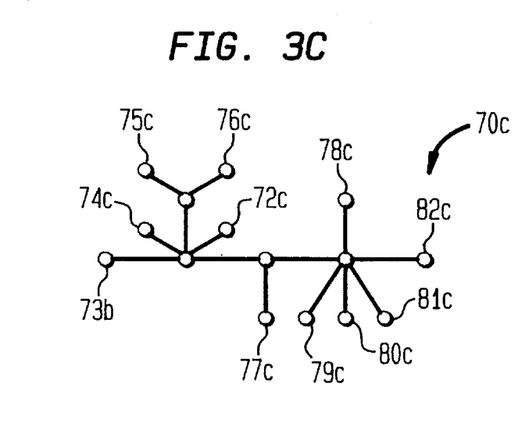
FIG. 3C is a partial branch-decomposition of the communications network shown in FIG. 3A.

FIG. 3C illustrates a partial branch-decomposition 70c of the network 70a. Just as with the branch-decomposition 70b, a plurality of leaves 72c–82c correspond to the edges 72a–82a of the network 70a so that the leaf 72c corresponds to the edge 72a, the leaf 73c corresponds to the edge 73a, and so on and that every leaf 72c–82c of the partial branch-decomposition 70c corresponds to one of the edges 72a–82a of the network 70a. However, for the partial branch-decomposition 70c, some of the non-leaf nodes of the partial branch-decomposition 70c are connected to more than three edges of the partial branch-decomposition 70c. Use of a branch-decomposition and a partial branch-decomposition for ring routing is described in more detail hereinafter.

The discussion which follows involves construction of a partial branch-decomposition and ultimately a branch-decomposition (both designated as T) of the network (designated as G), by working with E(G) and V(G) (the edges of G and the vertices of G, respectively) to separate G into many parts. If e is an edge of T then the graph T\e obtained from T by deleting the edge e has exactly two connected components, and consequently the set of leaves of T is partitioned into two subsets, those in the first component and those in the second. Since each leaf of T is associated with an edge of G, removing the edge e from T yields a partition of E(G) into two subsets, $A_e$ and $B_e$. The particular configuration of the partition depends on the particular edge e that is chosen.

Any partition of E(G) into two sets (A, B) is deemed a "separation" of G. Let (A, B) be a separation of G. For any vertex, v, in G (i.e., v e V(G)), there are four possibilities: There may or may not be an edge in A incident with v and there may or may not be an edge in B incident with v. Since A U B=E(G), if there is any edge at all incident with v it must belong either to A or to B. Therefore, there are three types of vertices: vertices incident with both an edge in A and with an edge in B (deemed "middle vertices" of the separation), vertices incident with an edge in A but not with any in B (deemed "left vertices") and vertices incident with an edge in B but not with any in A (deemed "right vertices"). To separate G, the vertices of G are partitioned into three sets: middle (A, B), left (A, B) and right (A, B). Note that no vertex in left (A, B) has a neighbor in right (A, B), because any such edge would not belong to A and would not belong to B, which is impossible. Consequently, middle (A, B) separates left (A, B) from right (A, B). The cardinality (i.e., number of elements) of middle (A, B) is deemed the "order" of the separation (A, B).

There are different types of separations that separate a graph into two portions. A two-separation is a separation of order two. An internal two-separation is a two-separation where each portion contains at least two edges. A three-separation is a separation of order three. An internal three-separation is a three-separation where each portion contains at least four edges. Details of how to make use of different types of separations are given below.

For the partial branch-decomposition T of the network G, there is a separation $(A_e, B_e)$ of G for each edge e of T. Let k>0 be an integer. If $(A_e, B_e)$ has order less than or equal to k for every edge e of T, then T has width less than or equal to k. The branch-width of a network G can be defined by stating that G has branch-width$\leq$k if there is some branch-decomposition T of G with width$\leq$ k.

Initially, a partial branch-decomposition of G is provided as a tree T configured as a "star" (that is, one of the vertices of T is adjacent to all the other vertices) with |E(G)| leaves. Each leaf v is associated one to one with an edge f(v) of G. Therefore, the initial T is a partial branch-decomposition of order$\leq$2. The initial T is not a branch-decomposition because T is not ternary (i.e., at least one of the internal nodes has an order greater than three).

The technique described hereinafter involves repeatedly choosing a vertex of T having a valency$\geq$4 and "splitting" the tree into two adjacent vertices of valency$\geq$3. When the splitting process terminates, the tree T is ternary and is a branch-decomposition of the network 30. At each iteration, one new separation is introduced. The splitting is chosen in such a way as to keep the order of the separation as small as possible.

At the start of the ith iteration, the tree T is a partial branch-decomposition $T_i$, having precisely i internal vertices. If every internal vertex has valency of 3, then the process is complete since $T_i$ is a branch-decomposition. Otherwise, an internal vertex of $T_i$ having a valency$\geq$4 is chosen and "split". Let D be the set of edges of $T_i$ incident with v. Let D be partitioned into two sets X, Y both of cardinality$\geq$2, in an appropriate way. In $T_i$, replace the vertex v by two new vertices, x and y, so that x is an end of each edge in X, y is an end of each edge in Y, and there is an edge xy, thus forming $T_{i+1}$. Thus, for $T_{i+1}$, every internal vertex has valency$\geq$3, since |X|, |Y|$\geq$2, and so $T_{i+1}$ is a partial branch-decomposition of G. The above technique is performed for each iteration.

$T_i$ is defined as being extendible if there is some way to (repeatedly) split the vertices of $T_i$ with valency $\geq$4 to obtain a branch-decomposition of small width (of width equal to the branch-width of G, say). Certainly $T_1$ is extendible. Thus, X and Y need to be chosen at each iteration so that if $T_i$ is extendible then so is $T_{i+1}$. The following is a discussion of how to split $T_i$ (and hence how to separate the network 30, G) in a way that results in a branch-decomposition T having a branch-width less than or equal to a predetermined constant value and then how to use the branch-decomposition T to determine the lowest cost ring through a subset of the nodes of the network 30.

Figure 4:
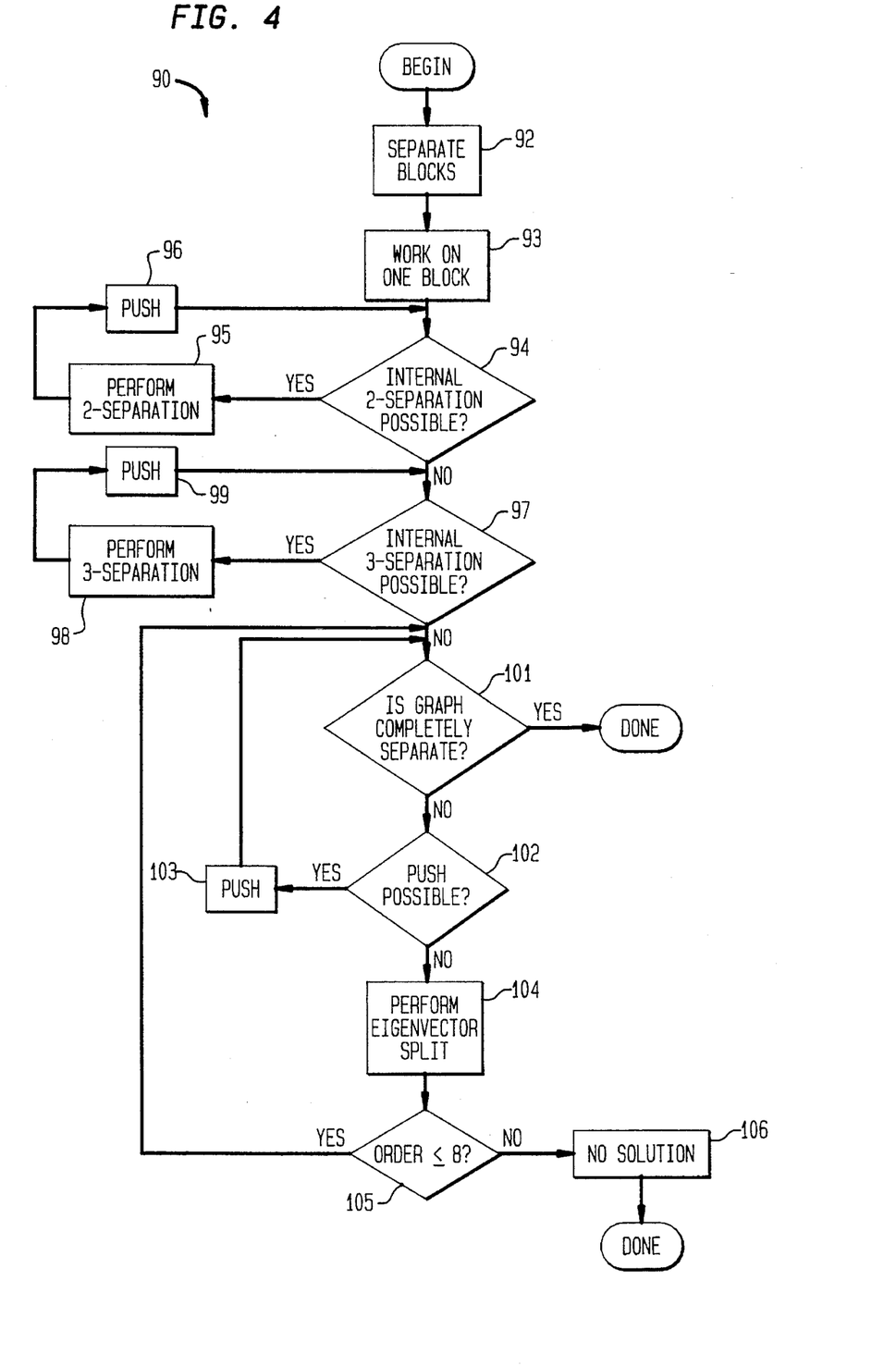
FIG. 4 is a flowchart illustrating steps for forming a branch-decomposition of a network.

FIG. 4 is a flowchart 90 of the ring router application that illustrates construction of a branch-decomposition for the network 30 by repeatedly separating the network 30 and performing a corresponding operation on a partial branch-decomposition, T, of the network 30 corresponding to the graph G. At a first step 92, the network 30 is separated into individual blocks. A block is a maximal two-connected subgraph where a two-connected subgraph is a portion of the graph that remains connected to the graph after removal of any one node. Separating a network into separate blocks is described in detail in R. E. Tarjan, "Depth-first search and linear algorithms", *Siam Journal on Computing*, 1 (1972) 146–160.

Following the step 92 is a step 93 where one block of the network 30 is selected. Each block of the network 30 is worked on separately. As is described in more detail hereinafter, no ring can span more than one block.

Following the step 93 is a test step 94 to determine if any internal two-separations exist in the network 30 for portions of the network 30 corresponding to a node of the tree, T, having a valency>3. Determining if any internal two-separations exist is as follows: for each internal vertex v of T having a valency>3, let D be the set of edges of T incident with v. An internal two-separation exists if there is a partition X,Y of D with |X|, |Y|$\geq$2 such that |M(X,Y)|=2. That is, if the set of edges D can be partitioned into two sets X and Y having at least two edges each and the M(X, Y), the middle of the X–Y partition, has an order two, then an internal two-separation exists. To test if there is such a partition, a graph H is constructed with vertex set $U(M_e)$ where e is one of the edges in D in which two vertices are adjacent if some $M_e$ contains both vertices. The graph H is necessarily two-connected and any internal two-separation of H yields the desired kind of partition of the network 30.

To test for this, a vertex x of H and three edges e,f,g of H incident with x are chosen. First an attempt is made to find a set (A,B) with e being an element of A and f being an element of B. To do this, (A, B) is chosen with e,g being elements of H and f being an element of B of order two with A minimal, and a determination is made to see if |right(A B)| is not zero Failing this, the process is repeated, this time with e being an element of A and f,g being elements of B, with B minimal, and a determination is made to see if |left(A , B)| is not zero. Again, if this fails, e and f are on the same side of every separation (A, B) of H of order two with left (A, B), right(A, B) not being equal to zero, so a separation (A, B) of H of order two is chosen with e, f being elements of A, with A minimal, and a determination is made to see if |right (A, B)| does not equal zero. If this fails, there is no choice of (A, B) possible and no splitting of v is possible with a two-separation.

If one of the above three tests succeeds, then an internal two-separation exists and control transfers from the step 94 to a step 95 where the network 30 is separated with an internal two-separation of G, as described above (i.e., the internal two-separation is the sets A and B determined at the step 94).

Following the step 95 is a step 96 where the separation is "pushed". Pushing is a technique wherein previous separations form the basis for creating new separations. Pushing is described in detail below:

Let $T_i$ be a partial branch-decomposition of G, let v be one of the vertices of T with valency$\geq$4 and let D be the set of edges of $T_i$ incident with v. For each edge e of D, let $M_e$ be the middle of the separation of G arising from e. Now suppose that e1, e2 are elements of D and are distinct, and the pushing inequality:

$$|(M_{e1} \cup M_{e2}) \cap \cup(M_e e \in D-\{e1, e2\})| \leq \max(|M_{e1}|, |M_{e2}|)$$

holds; then taking $X=\{e1, e2\}$, $Y=D-X$ yields a tree $T_{i+1}$ which is extendible if $T_i$ is extendible. This is deemed "pushing" the separations made by e1 and e2 toward v. $T_{i+1}$ is obtained by the pushing. The edges e1, e2 of the tree $T_i$ represent two distinct separations of the network 30 and the above pushing inequality indicates that when the number of vertices that are in the union of middles of the two separations and that are in the middle of another separation arising from an edge in D is at most the maximum of the orders the separations, then pushing is possible.

There are several ways of constructing the next tree $T_{i+1}$, given $T_i$, to introduce a new separation. In general, when a new separation is introduced, the new separation is pushed toward both ends of the corresponding edge of the tree. Pushing provides more separations that can be pushed. An initial choice of a separation followed by pushing can in some cases completely decompose the network 30 to provide a branch-decomposition of the network 30. Accordingly, the step 96 and any other pushing steps in the flowchart 90 represent repeatedly pushing to provide separations until the pushing inequality, above, no longer holds true.

Every separation that is created as a result of pushing is checked to determine if the new separation can be pushed in either direction. Any separation that can be pushed is pushed as soon as possible. It is not necessary to keep rechecking old separations, however. The only pairs that might become pushable after introducing some new separations each involve at least one of the new separations. Some bookkeeping is required, because each new separation provides two directions to push. If the first succeeds, there are two new separations to try and push (each in one direction), and so on. As the checking is done, the software keeps track, using conventional means, of which pairs have already been checked and which might still be pushable.

For a new separation, it is necessary to examine all edges $e2 \in D-\{e1\}$ and check the pushing inequality. However, for any edge e2 for which the pushing inequality holds, there will be a vertex $w \in M_{e1} \cap M_{e2}$, such that $w \notin M_e$ for all $e \in D-\{e1,e2\}$, thus eliminating most possibilities for e2. So instead of checking through all $e2 \in D-\{e1\}$, only vertices $w \in M_{e1}$, which belong to exactly one other $M_{e2}(e2 \in D)$ need to be checked.

After no more pushing is possible, control transfers from the step 96 back to the step 94 to determine if more internal two-separations are possible. If not, then control passes from the step 94 to a test step 97 to determine if any internal three-separations exist in the network 30. The test for internal three-separations is similar to the test for internal two separations and is described below:

At the step 97 the partial branch-decomposition $T_i$ has a width $\leq 3$. At the step 97 a test is made to determine if it is possible to split each internal vertex of $T_i$ with a three-separation. The graph H is constructed as described above in connection with the internal two-separations. H is now three-connected. First a test is made to determine if some $x \in V(H)$ (i.e., a vertex of the graph H) has valency 3 and has two adjacent neighbors. If so, let $X=(e \in D:X \in M_e)$ and $Y=D-X$. The internal three-separation can be made according to X,Y. If there is no such x, then x is chosen arbitrarily. If w and y are distinct neighbors of x, and z is a neighbor of y different from w, z, then a test is made to determine if there is a three-separation (A, B) of H such that left(A, B) and right(A, B) both meet (w, x, y, z) and left(A, B), right(A, B) both have size $\geq 2$. The test is performed by enumerating the different possibilities for which vertices of w, x, y, z are on the left and right, and solving a max-flow problem in each case. If an internal three-separation is not found this way, then a three-separation (A, B) of H with $\{wx, xy, yz\} \subseteq A$ and with A minimal is chosen, and a determination is made to see if right (A, B) has size $\geq 2$. If so, then an internal three-separation exists at the node v. If not, then v cannot be split with an internal three-separation, and another vertex of $T_i$ is examined.

If an internal three-separation exists, then control passes from the step 97 to a step 98 where the network 30 is separated with an internal three-separation. Note that, just as with the internal two-separation, described above, the test for the internal three-separation also indicates where in the network 30 (and in the corresponding tree T) the internal three-separation exists. Following the step 98 is a step 99 where the recent internal three-separation is pushed. The details of pushing are described above in connection with the step 96. Following the step 99, control transfers back to the step 97 to determine if more internal three-separations exist in the network 30.

If it is determined at the step 97 that no more internal three-separations exist, then control transfers from the step 97 to a step 101 where a test is made to determine if the graph (network 30) is completely separated. Note that, as discussed above, the network 30 is completely separated when the tree T is ternary. The tree T is ternary when all nodes of T have a valency of either one (for leaf nodes) or three (for non-leaf nodes). If at the step 101 the network 30 is completely separated, then processing is complete and the resulting branch-decomposition is used to calculate the lowest cost ring in a manner described in detail hereinafter.

If at the step 101 the graph is not completely separated, then control passes from the step 101 to a test step 102 to determine if a push is possible. Note that the first time the test step 102 is executed, a push will probably not be possible because all of the two-separations and three-separations, if any, were pushed during execution of the steps 94-99, discussed above.

If it is determined at the step 102 that a push is possible, control passes from the step 102 to a step 103 where any new separation is pushed until pushing is no longer possible, as described above in connection with the steps 96,99. Following the step 103, control passes back to the step 101 to test if the network is completely separated, as described above.

If it is determined at the step 102 that a push is not possible, control transfers from the step 102 to a step 104 to perform an eigenvector split of the graph. The eigenvector split is a technique for separating the portions of the network 30 that have not already been separated by the two-separations, three-separations, and pushing. The eigenvector technique is used to split the network 30 in the following manner:

Let G represent the network, $T_i$ represent the partial branch-decomposition obtained from all of the splitting performed so far, v represent an internal vertex of $T_i$ with a valency $\geq 4$, D represent the set of edges of $T_i$ incident with v, and the $M_e$ represent the middle of the separation arising in G as a result of removing e from $T_i$. It is desirable to choose a partition (X, Y) of D with $|X|, |Y| \geq 2$, so that the derived tree $T_{i+1}$ is extendible if $T_i$ is extendable. The following empirical observation is useful: if (X, Y) is chosen with M(X, Y) small, in such a way that $|X|, |Y| \geq |D|/3$, then very likely the resulting $T_{i+1}$ is extendible. Also, if $T_i$ is extendible, then there always is a choice of (X, Y) with M(X, Y) small with $|X|, |Y| \geq |D|/3$. In view of the above, it is desirable to solve the following problem: given a set V, and a collection $M_e (e \in D)$ of subsets of V, such that every member of V is at least two of the $M_e$'s, it is desirable to choose a partition (X,Y) of D with $|X|, |Y| \geq |D|/3$ and with $$|U(M_e: e \in X) \cap U(M_e: e \in Y)|$$

as small as possible. This is known as the "separator problem".

A heuristic method can be used to solve the separator problem, as follows: For $v \in V$ let $N_v = \{e \in D : v \in V\}$. First, construct a $|D| \times |D|$ matrix $M = (m_{ij} : i, j \in D)$ as follows: For $i, j \in D$ with $i \neq j$, let $$m_{ij} = \Sigma(-1/(|N_v|-1): v \in V, \{i,j\} \subseteq N_v)$$

For each $i \in D$, let $$m_{ii} = |\{v \in V: i \in N_v\}|.$$

Then for each i, $\Sigma_{j \in d} m_{ij} = 0$, and every eigenvalue of M is non-negative.

Next, x, an eigenvector of M corresponding to the second smallest eigenvalue of M is computed. To compute x, the matrix $N = cI - M$ is used where c is an appropriate large constant (such as, for example, 1.55 times the largest of the $m_{ii}$'s). An eigenvector of N corresponding to the second largest eigenvalue is determined. Since the vector of all 1's corresponds to the largest eigenvalue of N, then choosing a general vector y with $1^T y = 0$ causes the sequence y, Ny, $N^2 y$, $N^3 y$, ... to converge (modulo normalization) to the required eigenvector. To pick a "general" vector y, a random vector is chosen and a constant vector is added to satisfy $1^T y = 0$. An assumption is made that the sequence converges sufficiently after $20|D|$ steps. In computing the sequence, conventional normalization is occasionally performed to keep the arithmetic from overflowing. Also, because of roundoff errors, if $z_i$ is the value of $N_i y$ that is computed, the equation $1^T z_i = 0$ is sometimes not quite true, and so $z_i$ is shifted by a constant vector to make the equation true.

Let $x = (x_i : i \in D)$ be the eigenvector found by the steps described above. D can be ordered so that the numbers $x_i$ are in non-decreasing order. Let A be the $\lceil |D|/3 \rceil$ first terms and B be the $\lceil |D|/3 \rceil$ last terms.

Given $A, B \subset D$ as shown above, a partition (X,Y) of D can be computed with $A \subseteq X$ and $B \subseteq Y$ such that $$|U(M_e: e \in X) \cap U(M_e: e \in Y)|$$

is minimum. This is a standard network flow problem and is easily solved, as follows: Let H be the graph with vertex set V, in which distinct u, v are adjacent if they both belong to some $M_e$. Let $A' = U(M_e: e \in A)$ and $B' = U(M_e: e \in B)$ Then $A', B' \subseteq V(H)$ The smallest order separation (P,Q) of H is found with $A' \cap right(P, Q) = 0$ and $B' \cap left(P,Q) = 0$. Then for each $M_e$, either $M_e \cap right(P,Q) = 0$ or $M_e \cap left(P,Q) = 0$ (and in particular, $M_e \cap right(P,Q) = 0$ if $e \in A$ and $M_e \cap left(P,Q) = 0$ if $e \in B$). A partition (X, Y) of D is chosen such that $M_e \cap right(P, Q)$ for each $e \in X$, and $M_e \cap left(P, Q)$ for each $e \in Y$, and with $A \subseteq X$ and $B \subseteq Y$. There may be some sets $M_e$ with $M_e \cap right(P, Q) = 0$ and $M_e \cap left(P, Q) = 0$, and there is a choice whether to add the sets to X or to Y. In that case, the sets can be added to either. The sets X, Y computed above are a heuristic solution to the separator problem.

Following the step 104 is a test step 105. The test at the step 105 determines if the order of the separation (i.e., the number of elements in the middle of the separation) made at the step 104 is greater than a predetermined constant value. The predetermined constant value shown at the step 105 is eight. If the order of the separation is greater than eight at the step 105, control passes from the step 105 to a step 106 where the application indicates that no solution to the problem will be provided. After the step 106, execution of the application is complete. Limiting the order of the separation limits the branch-width of the resulting branch-decomposition and hence minimizes the processing time for calculating the lowest cost ring from the branch-decomposition, which is described in detail hereinafter.

If at the step 105 the order of the separation is determined to be less than or equal to the predetermined value, control passes from the step 105 back to the step 101 to continue execution of the steps 101–105 where the network is continuously pushed and possibly split using the eigenvector method until the graph is determined to be completely separated at the step 101.

Figure 5:
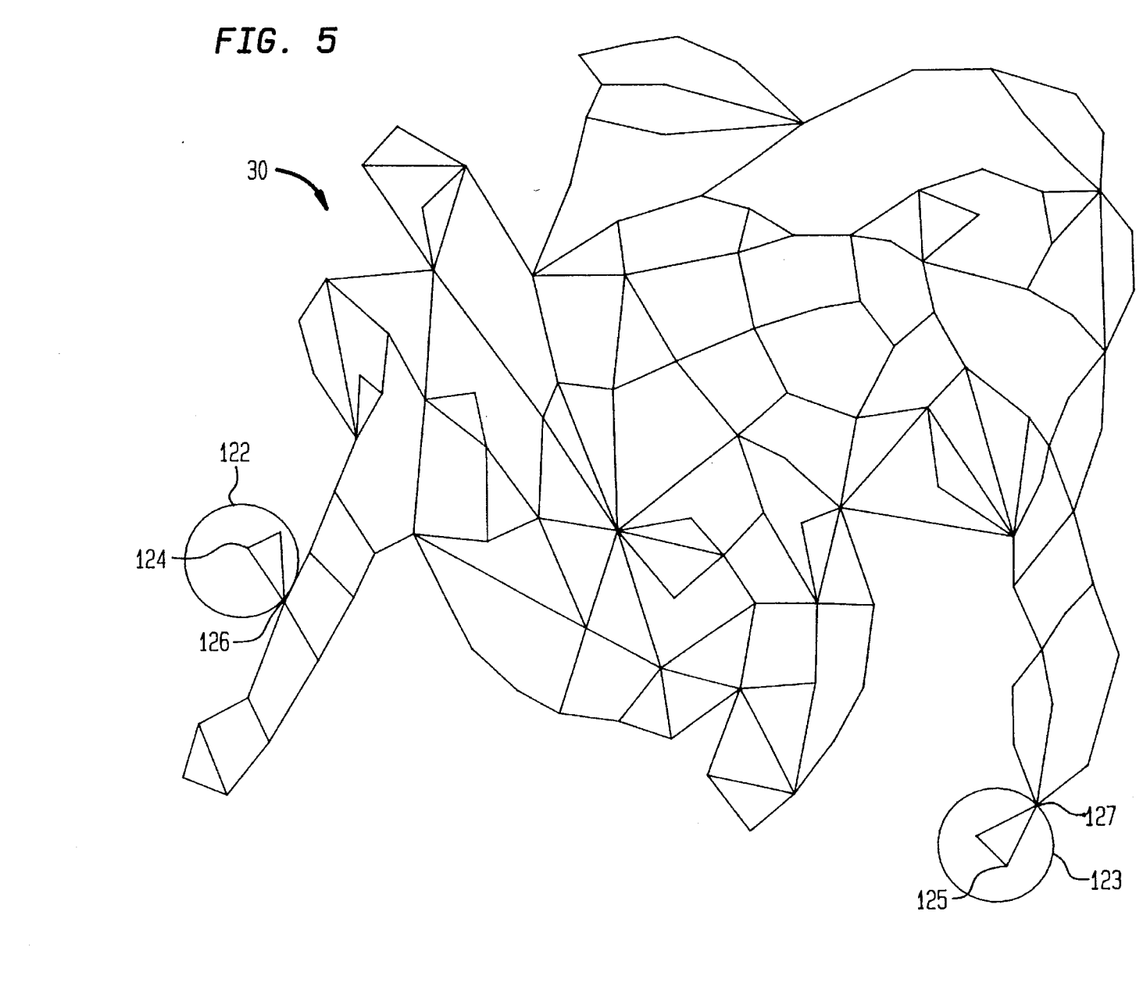
FIG. 5 is a schematic view of a communications network showing separation of blocks of the network.

FIG. 5 graphically illustrates the step 92 of the flowchart 90 of FIG. 4 where the network 30 is separated into blocks. The network 30 consists of three blocks. Two of the blocks are indicated by circles 122, 123 around nodes of the network 30. The third block is simply the remainder of the network. The block indicated by the circle 122 contains a node 124 and the block indicated by the circle 123 contains the node 125. The block indicated by the circle 122 is connected to the rest of the network 30 by a single node 126 and the block indicated by the circle 123 is connected to the rest of the network 30 by a single node 127.

As described hereinafter, in order for there to be a solution to the ring router problem, the nodes of the ring cannot span more than one block so that, for example, if the proposed ring is required to pass through either the node 124 or the node 125, there can be no solution to the ring router problem since the circuit would have to pass through one of the connecting nodes 126, 127 twice. As discussed above, a ring cannot pass through a single node twice.

Figure 6A:
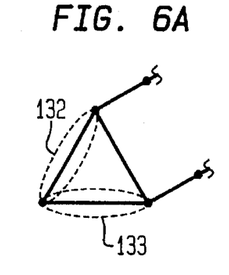
Figure 6B:
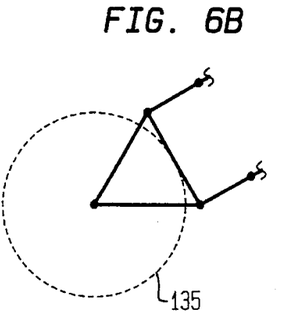

FIG.'s 6A–6H use the bottom left hand portion of the network 30 shown in FIG. 1 to graphically illustrate some of the separation techniques discussed above. In FIG. 6A, two separations 132, 133 are shown. The separations 132, 133 could be the result of one or more internal two-separations performed on the network 30. FIG. 6B shows a separation 135 obtained by pushing the separations 132, 133. The separation 135 is found by taking the union of the separations 132, 133. Note that the pushing inequality, shown above, holds for the separations 132, 133.

Figure 6C:
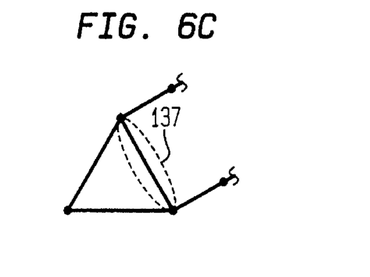
Figure 6D:
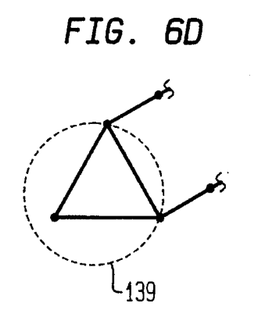
Figure 6E:
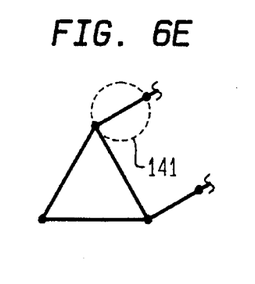
Figure 6F:
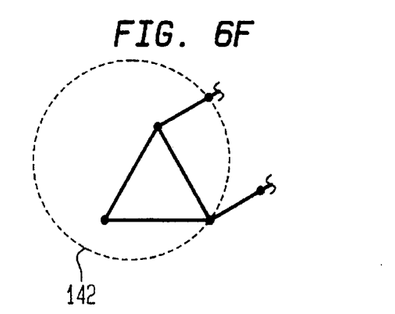
Figure 6G:
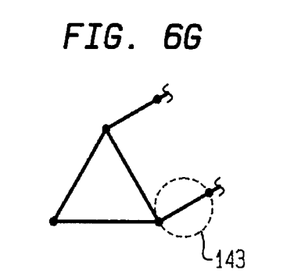
Figure 6H:
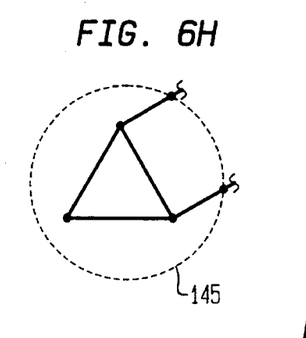

FIG. 6C shows another separation 137. FIG. 6D shows a separation 139 that results from pushing the separation 137 of FIG. 6C with the separation 135 of FIG. 6B. FIG. 6E shows another separation 141 and FIG. 6F shows a separation 142 that results from pushing the separation 141 of FIG. 6E with the separation 139 of FIG. 6D. FIG. 6G shows another separation 143 and FIG. 6H shows a separation 145 that results from pushing the separation 142 of FIG. 6F with the separation 143 of FIG. 6G. FIG.'s 6A–6H illustrate the iterative process of performing separations and pushing in order to separates the network 30.

Figure 7A:
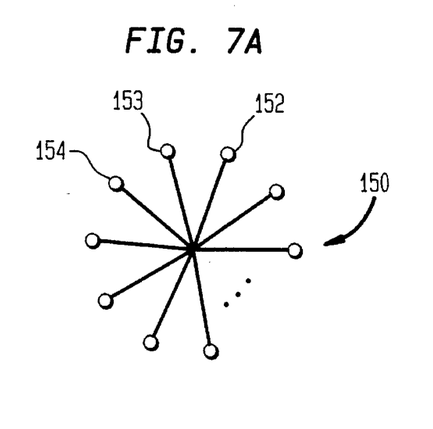

FIG. 7A illustrates an initial partial branch-decomposition 150 corresponding to the network 30 of FIG. 1. Leaves 152–154 of the partial branch-decomposition correspond to edges of the network 30. As discussed above, the initial partial branch-decomposition 150 is configured as a "star".

Figure 7B:
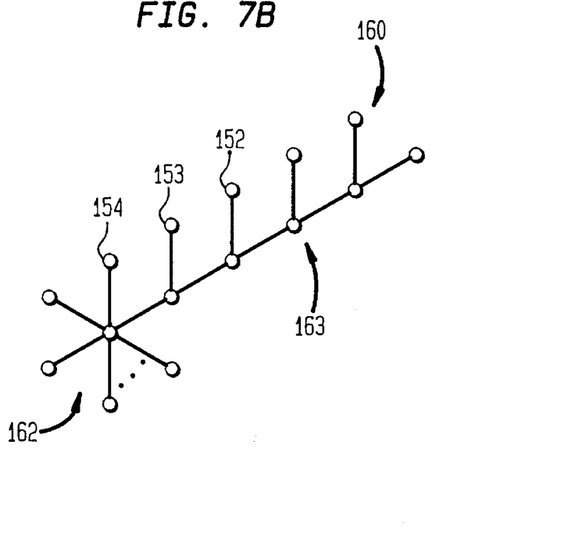

FIG. 7B shows a partial branch-decomposition 160 after some separations have been performed on the network 30. The partial branch-decomposition 160 has a star portion 162 and a ternary portion 163. As each separation of the network 30 is performed, edges that are part of the star portion 162 are reconfigured to become part of the ternary portion 163 when modifications corresponding to separations, as described above, are performed on the partial branch-decomposition 160. The separation process is complete when the partial branch-decomposition 160 becomes a branch-decomposition having every node with a valency of either one or three.

Figure 8:
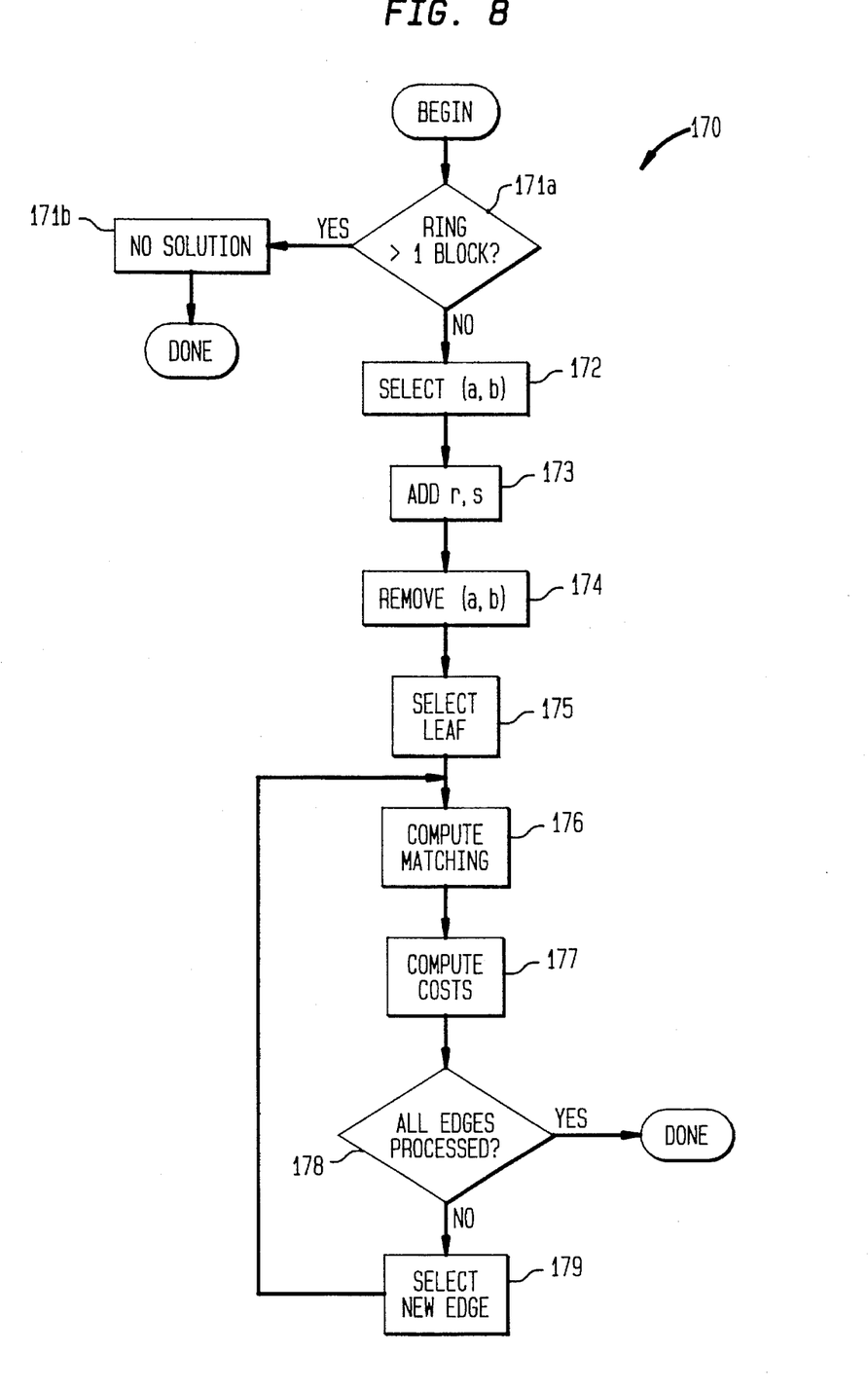
FIG. 8 is a flowchart illustrating steps for using a branch-decomposition of a network to calculate costs of a ring in the network.

FIG. 8 is a flowchart 170 illustrating a portion of the software for using the branch-decomposition, T, to calculate the minimum cost of a ring through a subset of nodes of the network. Once a branch-decomposition tree, T, has been obtained, the routing algorithm uses the separations to find rings or partial rings in subsets of edges until an optimal ring for the network 30 is obtained.

For any separation (A, B) of the edge-set, E(G), of the network 30, the algorithm makes use of the fact that rings can only pass through middle(A, B) in a limited number of ways. Thus, after processing A, it is possible to encode the various ways partial rings in A hit middle(A, B), and then solve the ring router problem by working on B and the encoded information.

Let $n_1, n_2, \ldots, n_k$ be the vertices in middle(A, B), and let R be a partial ring in A. That is, R is a subgraph of G with $E(R) \subseteq E(A)$, and every component of R is a path of length$\geq 1$ with both ends in middle(A, B). For any ring C in G that is not contained in A, C meets A in a partial ring. A middle vertex $n_i$ meets either 0, 1, or 2 edges in R. The vertex $n_i$ is deemed to be "free" if it meets 0 edges, "paired" if it meets 1 edge, and "used" if it meets 2 edges. Following the path in R meeting a paired middle vertex $n_j$, leads to another paired middle vertex $n_k$. It is therefore possible to specify how R hits middle(A, B) by listing the pairs $(n_j, n_k,)$ of paired vertices and listing the used vertices. Such an encoding is referred to as a "matching". A is processed by determining the list of matchings corresponding to the partial rings of A. In the case of solving the ring router problem for a specified subset of the vertices of G, when two partial rings in A produce identical matchings, then only one of the matchings needs to be stored and the least costly partial ring is recorded.

If A consists of only 1 edge, then it is easy to process: the only matchings on the middle vertices $n_1, n_2$ are either to have both $n_1$ and $n_2$ free, or to have $n_1$, paired with $n_2$. If there is only one middle vertex $n_1$, then the only possibility is to have $n_1$ free.

Another easy case is the following: Suppose the separations (L,M) and (R,S) have been processed, and it is desirable to process the union L U R. Note that each vertex in middle(L U R, M U S) is either in middle(L, M), or in middle(R, S), or in both middle(L, M) and middle(R, S). The matchings for L U R can be determined by studying only the matchings for L and the matchings for R, without having to know anything else about the graph G. Any partial ring for L U R must arise as the disjoint union of a partial ring for L and a partial ring for R. Not all unions of partial rings for L and R will be a partial ring for L U R since (a) the union may consist of a circuit plus some additional edges or (b) the union may have a vertex in the interior of L U R (those vertices that do not meet any edges outside of L U R) that meets only one edge in the union, or (c) there may be an interior vertex that is in W (the specified set of vertices of G that must be covered by the solution to the ring router problem) but does not meet any edge in the union. Each of these cases can be determined by examining the matchings corresponding to the two partial rings.

It is therefore possible to proceed by running through all pairs of a matching for L and a matching for R and computing if each pair gives a valid matching for L U R, that is, checking to see that the partial rings represented by the two matchings can be combined to give a partial ring for L U R. This procedure involves some case analysis (checking that paired vertices combine properly and checking that each vertex in W that is in both middle(L, M) and middle(R, S) but not in middle(L U R, M U S) is non-free in at least one of the matchings, but as long as the middle sets contain only a limited number of vertices the processing can be carried out relatively quickly. Notice also that some pairs of matchings will produce an actual ring in the graph (not just a partial ring). The minimum cost of such a ring must be recorded as part of the procedure that processes L U R. Some details about how to process the pairs of matchings are given below.

Using the branch-decomposition, the above two easy cases indicate how to process the entire edge set E(G) (and hence solve the ring router problem) for the network 30 by starting at the leaves of the tree, T, of the branch-decomposition and working "inward". To make the notion of inward precise, the branch-decomposition is rooted by selecting an arbitrary edge (a, b) of the tree and adding new tree vertices r and s, and edges (a,s), (s, b), and (s, r), and removing the edge (a, b). Since no edge of G is assigned to r, the separations corresponding to (a, s) and (s, b) are the same as that for the old edge (a, b), and the separation for the edge (s, r) is the trivial separation (E(G), 0). Each vertex v of the rooted tree (other than the "root vertex", r) meets a unique edge that lies on a path in the tree from v to r, and if v is not a leaf it also meets two edges that do not lie on such a path. The unique edge is deemed the "root edge" of v and the two other edges the left and right edges of v (the choice of which is right and which is left is arbitrary). Since each tree edge e is the root edge of precisely one vertex v, when the separation corresponding to e is processed then the vertex v has been processed. A tree vertex is ready to be processed if either the vertex is a leaf of the tree (and is not the root vertex r), or both the right edge and left edge of the vertex have already been processed. The overall procedure is to select any ready tree vertex and process the vertex, stopping when the only remaining tree vertex is r. The optimal solution to the ring routing problem is the minimum cost ring among all those found while processing the vertices of the branch-decomposition tree, T.

It is possible to assign negative costs to the edges of the network 30 so that a route having more edges would have a lower cost. For instance, assigning equal negative costs to all of the edges of the network 30 causes the ring router application to find the "longest" route (i.e., the route with the most edges) through the selected subset of nodes. Finding the longest route rather than the shortest route is useful in many instances.

For more information relating to using a branch-decomposition to calculate costs of rings through a network, see S. Arnborg, J. Lagergren and D. Seese, "Easy problems for tree-decomposable graphs", *J. Algorithms* 12 (1991), 308–340; S. Arnborg and A. Proskurowski, "Linear time algorithms for NP-hard problems on graphs embedded in k-trees", preprint TRITA-NA 8404(1984), Dept. of Numerical Analysis and Computer Science, The Royal Institute of Technology, Sweden; and H. L. Bodlaender, "Dynamic programming algorithms on graphs with bounded tree-width", in *Proc. 15th Intern. Coll. On Automata, Languages and Programming, Lecture Notes in Computer Science* 317 (1988), 105–119 (Springer-Verlag).

Referring to FIG. 8, the flowchart 170 begins at a first step 171a where a test is made to determine if the nodes of the ring (i.e., the subset of nodes indicated by the ring node data 66) span more than one block of the network 30. If so, control passes from the test step 171a to a step 171b where the application indicates that there is no solution to the problem (i.e., there is no ring that passes through the subset of nodes indicated by the ring node data 66). Note that, by definition, a ring cannot pass through a single node more than once so that there can be no ring that spans more than one block. After the step 171a, execution of the application is complete.

If the ring does not span more than one block, control passes from the step 171a to a step 172 where an arbitrary edge (a,b) of the branch-decomposition tree, T, is selected. Following the step 172 is a step 173 where vertices r and s are added to the tree along with the edges (a,s), (s,b), and (s,r). Following the step 173 is a step 174 where the edge (a,b) is removed from the tree. Following the step 174 is a step 175 where a leaf is selected in order to begin processing of the tree.

Following the step 175 are steps 176, 177 where the matchings and the costs, respectively, are computed in the manner discussed above. Following the step 177 is a test step 178 which determines if the entire tree, T, has been processed. As discussed above, the entire tree is processed when all of the edges, except the edge (r,s), have been processed. If all of the edges of the tree have been processed, execution is complete. Otherwise, control transfers from the step 178 to a step 179 where a new edge is selected for processing by the technique discussed above. Following the step 179, control transfers back to the step 176 in order to process the newly selected edge.

The above described ring router algorithm applies to a single instance of the problem, with a specified set S of vertices that the ring passes through (i.e., the ring nodes data 66 of FIG. 2). In many cases, it is desirable to find a solution of ring router problems with many different sets S (but with the same graph G for the network 30). The above-described implementation is designed to take advantage of the information that can be shared among the multiple S sets. In a preprocessing phase, it is possible to build "super" lists of matchings for each tree edge that can be used to build the actual matching list for any specific set S during a second, S-processing, phase.

Since the first phase does not have access to the requested set S, the matching lists that are built must contain information in addition to the matchings. Let v be a tree vertex, with left edge a, right edge b, and root edge c, and let C denote the subset of E(G) corresponding to c. That is, C consists of edges that are assigned to the leaves in the component of T\e (i.e., the tree T with the edge e removed) that does not contain the root node r. Suppose a and b have been preprocessed, and c will preprocessed next. A list of matchings for c is constructed by running through the pairs of matchings from a's list and b's list, and computing the combined matchings. In the single S case, all that is needed is to record a single copy of each distinct matching for c since the only interest is in finding the minimum cost ring (and since the matching captures all of the information needed about a partial ring in C, the goal is to find the partial ring having the least cost). However, in the multiple S case, it may not be desirable to use the minimum cost realization of a given matching, since some set S may have vertices in the interior of C that are not covered by the minimum cost realization. The direct method of getting around this problem is to record the partial rings themselves, not just their matchings, but this requires a great amount of storage. Instead, it is possible to label the matchings of a and b, and for each distinct matching m of c, record a list of parents $(m_a, m_b)$, where $m_a$ is the label of a matching of a and $m_b$ is the label of a matching of b, that produce the matching m.

The system allows propagation of the covering information down the tree as the decomposition is S-processed. To be more precise, when a and b are S-processed, matchings of a and matchings of b that are legal are marked (that is, the matchings that can be realized by partial rings that cover all S-vertices in the interiors of the respective edge sets). For each legal matching, the cost of the minimum cost realization of the matching is recorded. The S-processing of c is performed by examining each matching m in c's list and running through c's list of parents, checking if there is some set $(m_a, m_b)$ such that $m_a$ is legal for a and $m_b$ is legal for b. If there is such a set of legal parents, c is marked as legal and the minimum cost of m over all sets of legal parents is recorded. The cost of m with respect to the parents $(m_a, m_b)$ is the sum of the costs of $m_a$ and $m_b$. As in the single S case, the cost of the minimum cost legal ring found while S-processing c is also recorded (so the preprocessing phase must also store the list of parents for each ring, just as for the partial rings). When the S-processing terminates, it is possible to find the optimal solution to the problem by checking the rings found at each vertex of the tree. The actual edgeset of the ring can be found by following the matching's parent labels back to the leaves of the tree, that is, looking at the parents of the matching, then the parents of the parents, and so on until leaves of the tree—the edges corresponding to leaves with matchings consisting of a pair of paired vertices (not two free vertices) are the edges in the ring.

Although the above-described two-phase implementation requires greater storage than that of a simply running the basic algorithm independently for each set S, the savings in time from not having to recompute the matchings (from lists of matchings of the left and right vertices) make the two-phase implementation much more efficient overall.

Although the invention has been shown and described with respect to exemplary embodiments thereof, it should be understood by those skilled in the art that various changes, omissions and additions may be made therein and thereto, without departing from the spirit and the scope of the invention.

What is claimed:

1. A method for selecting a communication ring path of lowest cost through a subset of nodes of a communication network, each edge of the network having a particular cost associated therewith, the method comprising the steps of providing a tree data structure wherein each leaf vertex of the tree represents an edge of the network and each non-leaf vertex of the tree is connected to exactly three edges of the tree, said tree data structure being a branch-decomposition having a pattern of separations of the network, a separation of the network corresponding to each edge of the tree;

in response to each separation of said branch-decomposition having a number of nodes less than or equal to a predetermined constant, determining costs associated with portions of the ring path passing through separations of the branch-decompositions by sequentially examining pairings of nodes of the separations of the branch-decompositions; and selecting a lowest cost ring path based upon such examinings.

2. A method for selecting a communication path ring through a subset of nodes of a communication network in accordance with claim 1, wherein said step of providing a tree data structure which is a branch-decomposition includes the steps of:

testing if an internal separation of order two exists in the communication network;

separating the communication network using an internal separation of order two if such internal separation of order two exists; and repeating said testing and separating steps until no further internal separations of order two exist in the network.

3. A method for selecting a communication path ring through a subset of nodes of a communication network in accordance with claim 1, wherein said step of providing a tree data structure which is a branch-decomposition includes the steps of:

testing if an internal separation of order three exists in the communication network;

separating the communication network using an internal separation of order three if such a separation of order three exists; and repeating said testing and separating steps until no further separations of order three exist in the network.

4. A method for selecting a communication path ring through a subset of nodes of a communication network in accordance with claim 1, wherein said step of providing a tree data structure which is a branch-decomposition includes the steps of:

selecting an eigenvector separation of the communication network;

testing if said eigenvector separation has an order that is less than or equal to the predetermined constant; and in response to the order of separation being less than or equal to said predetermined constant, repeating said selecting and testing steps until no further separations can be performed.

5. A method for selecting a communication path ring through a subset of nodes of a communication network in accordance with claim 1 wherein said predetermined constant has a value of eight.

6. A method for selecting a communication path ring through a subset of nodes of a communication network in accordance with claim 1 further comprising the step of providing negative costs for some of the edges of the communication network.

* * * * *